US012044698B2

United States Patent
Guichard et al.

(10) Patent No.: US 12,044,698 B2
(45) Date of Patent: Jul. 23, 2024

(54) METHOD FOR SELF-TESTING AN ANGLE-OF-ATTACK PROBE AND METHOD FOR CHECKING THE VELOCITY OF AN AIRFLOW PROVIDED BY A SERIES OF ASSOCIATED PITOT PROBES AND ANGLE-OF-ATTACK PROBE

(71) Applicant: THALES, Courbevoie (FR)

(72) Inventors: Philippe Guichard, Valence (FR); Jean-Pierre Schlotterbeck, Valence (FR); Frédéric Sahliger, Valence (FR); Jean-Claude Bourland, Valence (FR); Philippe Rondeau, Valence (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/795,177

(22) PCT Filed: Jan. 29, 2021

(86) PCT No.: PCT/EP2021/052133
§ 371 (c)(1),
(2) Date: Jul. 25, 2022

(87) PCT Pub. No.: WO2021/152108
PCT Pub. Date: Aug. 5, 2021

(65) Prior Publication Data
US 2023/0091324 A1 Mar. 23, 2023

(30) Foreign Application Priority Data
Jan. 30, 2020 (FR) .................................... 20 00907

(51) Int. Cl.
G01P 21/00 (2006.01)
G01P 5/16 (2006.01)
G01P 13/02 (2006.01)

(52) U.S. Cl.
CPC ............... *G01P 21/00* (2013.01); *G01P 5/16* (2013.01); *G01P 13/025* (2013.01)

(58) Field of Classification Search
CPC .......... G01P 21/00; G01P 5/16; G01P 13/025; G01P 13/0046; G01P 21/025
(Continued)

(56) References Cited

U.S. PATENT DOCUMENTS

2019/0242924 A1  8/2019  Lang et al.
2023/0091324 A1* 3/2023  Guichard ................. G01P 5/16

FOREIGN PATENT DOCUMENTS

EP   2385378 A1   11/2011
FR   2626375 A1   7/1989
RU   2124711 C1   1/1999

OTHER PUBLICATIONS

French Search Report issued by the French Patent Office in corresponding French Application No. 20 00907, mailed Dec. 17, 2020.
(Continued)

*Primary Examiner* — Robert R Raevis
(74) *Attorney, Agent, or Firm* — ArentFox Schiff LLP (57) ABSTRACT

The present invention relates to a method for self-testing an angle-of-attack probe comprising the steps of controlling an angular excitation of a rotary element that is rotatable about its equilibrium position according to known excitation characteristics; acquiring angular measurements relating to the rotation of the rotary element, determining a parasitic torque applied to the rotary element on the basis of the angular measurements and of the excitation characteristics; comparing at least one component of the parasitic torque with at least one predetermined threshold and detecting an operating fault in the probe when said component exceeds the predetermined threshold.

15 Claims, 4 Drawing Sheets

(58) Field of Classification Search
USPC ..... 73/1.78, 170.02; 702/92, 93, 104; 701/6, 701/7
See application file for complete search history.

(56) References Cited

OTHER PUBLICATIONS

International Search Report issued by the International Searching Authority in corresponding International Application No. PCT/EP2021/052133, mailed Apr. 30, 2021.

* cited by examiner

METHOD FOR SELF-TESTING AN ANGLE-OF-ATTACK PROBE AND METHOD FOR CHECKING THE VELOCITY OF AN AIRFLOW PROVIDED BY A SERIES OF ASSOCIATED PITOT PROBES AND ANGLE-OF-ATTACK PROBE

CROSS-REFERENCE TO RELATED APPLICATIONS

The present Application for Patent is a National Stage Entry of International Application No. PCT/EP2021/052133, filed Jan. 29, 2021, which claims priority to French Patent Application No. 20 00907, filed Jan. 30, 2020. The disclosure of the priority documents are incorporated in their entirety by references therein.

FIELD OF THE INVENTION

The present invention relates to a method for self-testing an angle-of-attack probe.

The present invention also relates to a method for checking the velocity of an airflow provided by a series of associated Pitot probes and angle-of-attack probe.

The angle-of-attack probe according to the invention allows the measurement of an angle of attack of an aircraft.

BACKGROUND OF THE INVENTION

In the state of the art, many technologies exist for locally measuring the angle of attack of the aircraft. The measurement of this local angle, which is generally different from the overall angle, allows the corresponding avionics system to extrapolate the angle of attack of the entire airplane infinitely upstream.

Among the known technologies, the most widespread are rotary probes. There are essentially two major types of rotary probes: probes of the "vane" type, that is to say, with a paddle, and probes with differential pressure equalization between two zones.

Despite appearances, the underlying principle is the same for all types of rotary probes: the axis of symmetry of the probe aligns itself in the relative wind axis.

For vane-type probes, the return toward the equilibrium position is due to the equilibrium of the aerodynamic forces on either side of a rotary element having a paddle, the profile of which is symmetrical. Since the thrust center of the paddle is arranged behind the axis of rotation, the paddle finds its equilibrium in the relative wind axis. An angle sensor translates the information into a signal that is usable by the system and the pilot.

For differential pressure equalization probes, the part that is exposed to the airflow has an aerodynamic profile that is symmetrical with respect to the relative wind axis in the equilibrium position, but that is also symmetrical about the axis of rotation. It is therefore a cone, and not a paddle like in the preceding case.

Due to this symmetry, the cone is not subject to any rotational aerodynamic force, irrespective of its angle of rotation with respect to the relative wind. There is no aerodynamic return force. Two slots are arranged on either side of a generatrix line of the cone. A differential sensor measures the pressure deviation between these two openings, or more simply an inner partition finds an equilibrium position when the pressure values on either side of the inner partition are equal.

This inner partition for example has a rotary element whose angle of rotation may be determined by a sensor provided for that purpose. This angle of rotation then characterizes pressures and is used to locally determine the angle of attack of the aircraft.

In view of the significance of the angle of attack measured by the angle-of-attack probes, these probes are generally associated with testing means allowing detection of their faults.

These faults may be caused by parasitic torques applied to the rotary element of a probe, for example subsequent to deicing thereof.

Thus for example, document FR 2,626,375 is known, describing an angle-of-attack probe in which the damping function is performed electromagnetically so as to present minimal dry friction and/or parasitic torque. For testing purposes, the same means may perform a positioning role in a predetermined position. This function allows static testing of the probe when the aircraft is parked on the ground.

However, this solution does not allow checking of the integrity of the value supplied by the probe in flight.

Other solutions used in the art are based essentially on merging data from other sensors, so as to determine a likelihood of the angle-of-attack data.

We will in particular cite the use of the velocity measurement along the axis of the aircraft associated with the vertical acceleration relative to the aircraft. If the configuration of the wings and flaps is known, as well as the approximate mass of the aircraft, it is possible to use the calculation to work back to a likely angle of attack range by using the inertial, aircraft aerodynamic configuration and engine thrust parameters.

However, this type of solution has drawbacks that make it insufficient to guarantee the desired level of integrity.

First, it is based on the simultaneous integrity of several other systems. Thus, it suffices for one of these systems to be faulty or simply imprecise for false alarms to appear. This may then cause doubt in the angular measurements and lead to poor decisions for the remainder of the flight.

Next, cumulative uncertainties in the other parameters cause uncertainty in the estimated angle of attack value. Now, in some flight phases, the angular deviation between normal flight and stalling is small. Here again, false alarms could lead to wrongly discarding measurements from the probes, without having reliable backup.

Thus, for example, in architectures including only two series of angle of attack measurements, this situation could occur when only a single series is faulty, irrespective of the cause of this fault, even software.

SUMMARY OF THE INVENTION

The present invention proposes a self-testing function for an angle-of-attack probe that may be implemented in flight, without using data originating from other similar probes.

To this end, the invention relates to a method for self-testing an angle-of-attack probe, the angle-of-attack probe being able to measure the angle of attack of an airflow in a measurement region and comprising a rotary element that is rotatable about an axis of rotation under the influence of the airflow, the axis of rotation being substantially perpendicular to the direction of said airflow, the rotary element defining an equilibrium position in which its rotation about the axis of rotation is stabilized by the airflow.

The method comprises the following steps:
- controlling an angular excitation of the rotary element about its equilibrium position according to known excitation characteristics;
- acquiring angular measurements relative to the rotation of the rotary element;
- determining a parasitic torque applied to the rotary element from angular measurements and excitation characteristics;
- comparing at least one component of the parasitic torque with at least one predetermined threshold;
- detecting an operating fault in the probe when said component exceeds the predetermined threshold.

According to other advantageous aspects of the invention, the self-testing method according to the invention comprises one or more of the following features, considered alone or according to all technically possible combinations:
- the parasitic torque is determined by using a transfer function describing the rotation of the rotary element in the presence of this parasitic torque, the parasitic torque being defined by an inertial component such as a moment of inertia anomaly, a damping component, a proportional component such as an abnormal aerodynamic torque, and a friction or imbalance component of the masses;
- the inertial component, the damping component and the friction and imbalance component are determined by identifying the portion of the parasitic torque for each corresponding component by subtracting a predetermined portion of a maximum normal torque in its likelihood domain;
- a step for acquiring at least one value of the airflow velocity modulus, called consensus velocity, originating from measuring means that are materially separate from said probe;
- said measuring means preferably being another angle-of-attack probe or a velocity measurement series preferably comprising one or several Pitot probes and/or one or several lidars;
- the proportional component and a pressure velocity of the airflow are determined with respect to one another by using a first mechanization or a second mechanization;
- according to the first mechanization, the consensus velocity is inserted into the transfer function, the proportional component being determined by using the other components of the parasitic torque;
- according to the second mechanization, the proportional component is determined from a predetermined value, a pressure velocity value, called extrapolated velocity, being determined by using the set of components of the parasitic torque;
- the consensus velocity according to the first mechanization being compared to the extrapolated velocity according to the second mechanization, on the one hand, the proportional component according to the first mechanization being compared to the proportional component according to the second mechanization, on the other hand, a proper operation criterion being established if said comparisons fall within a predetermined likelihood domain;
- the excitation characteristics define a sinusoidal excitation of the rotary element, the frequency of which is preferably pseudo-random;
- acquiring data relative to the aerodynamic noise;
- modifying the excitation characteristics as a function of the acquired data relative to the aerodynamic noise.

The present invention also relates to a method for checking the velocity of an airflow supplied by a series of Pitot probes comprising a plurality of Pitot probes and a plurality of static probes, the series of Pitot probes being able to supply values of the airflow pressure velocity, called first velocity values, determined by using values originating from the Pitot probes and the static probes.

The checking method is implemented by using a series of angle-of-attack probes, the series of angle-of-attack probes comprising a plurality of angle-of-attack probes, each angle-of-attack probe being able to measure the angle of attack of the airflow and comprising a rotary element that rotates about an axis of rotation under the influence of the airflow and a processing module able to carry out the self-testing method as previously described.

The checking method is implemented when no operating fault of the angle-of-attack probes has been detected subsequent to implementation of the self-testing method by the processing module of each of the angle-of-attack probes.

The checking method comprises the following steps:
- acquiring pressure velocity values determined by the processing modules of the set of angle-of-attack probes, each of these values being called second velocity value;
- comparing the second velocity values with the first velocity values and, among these values, determining velocity values used to indicate the pressure velocity of the airflow;
- communicating the used velocity values with their precision.

According to other advantageous aspects of the invention, the checking method according to the invention comprises one or more of the following features, considered alone or according to all technically possible combinations:
- when during the comparison step:
- all of the first and second velocity values are consistent with one another, the set of first velocity values and of second velocity values are used at nominal precision;
- one of the first velocity values is inconsistent with respect to the other first velocity values and the second velocity values, which are consistent amongst themselves and with respect to the other first velocity values, said other first velocity values and all of the second velocity values are used at nominal precision;
- the first velocity values are inconsistent amongst themselves and none of these values is consistent with the second velocity values, which are consistent amongst themselves, said first velocity values are used at degraded precision and the second velocity values are used at nominal precision;
- all of the first values are consistent amongst themselves but inconsistent with respect to the second velocity values, which are consistent with one another, the set of first velocity values and of second velocity values are used at nominal precision with an indication of doubt regarding the supplied values;
- no velocity value is used in other cases.

The present invention also relates to an angle-of-attack probe able to measure the angle of attack of an airflow in a measurement region and comprising a rotary element that is rotatable about an axis of rotation under the influence of the airflow, the axis of rotation being substantially perpendicular to the direction of said airflow, the rotary element defining an equilibrium position in which its rotation about the axis of rotation is stabilized by the airflow; the angle-of-attack probe being characterized in that it further comprises a processing module able to carry out a self-testing method as previously described.

According to other advantageous aspects of the invention, the angle-of-attack probe according to the invention comprises one or more of the following features, considered alone or according to all technically possible combinations:

- an excitation motor able to cause an excitation of the rotary element about its equilibrium position according to the excitation characteristics, preferably the excitation motor being an electric motor coupled to a flywheel;
- stabilization means for stabilizing the rotary element about its equilibrium position, said stabilization means being mechanical or electrical in nature;
- the excitation motor has electrical stabilization means;
- a sensor capable of generating angular measurements relative to the rotation of the rotary element;
- the rotary element is a vane exposed directly to the airflow;
- the rotary element is comprised in a cone exposed to the airflow and symmetrical relative to the axis of rotation.

BRIEF DESCRIPTION OF THE DRAWINGS

These features and advantages of the invention will appear more clearly upon reading the following description, provided solely as a limiting example, and done in reference to the appended drawings, in which.

DETAILED DESCRIPTION OF THE INVENTION

Figure 1:
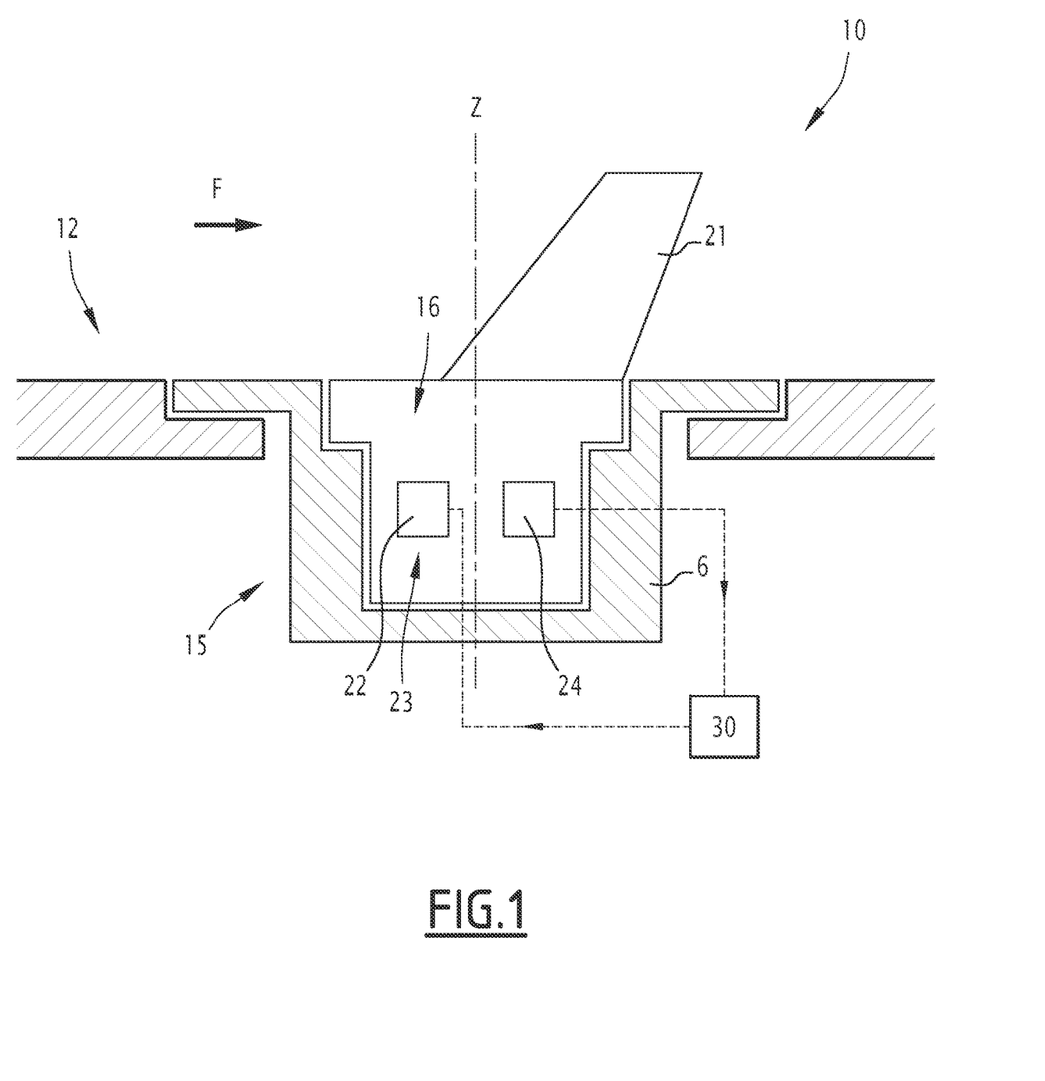
FIG. 1 is a schematic view of an angle-of-attack probe according to the invention.

FIG. 1 shows an angle-of-attack probe 10 according to the invention.

This probe 10 is for example integrated into the front part of the fuselage 12 of an aircraft and allows local measurement of an angle of attack of the aircraft.

In other words, the probe 10 allows measurement of the angle of attack in a measurement region then adjacent to the integration point of the probe 10 into the fuselage 12 of the aircraft.

In reference to FIG. 1, the probe 10 comprises a stationary part having a support 15 integrated immovably into the fuselage 12 of the aircraft and a movable part 16 mounted rotatably in the support 15 relative to the axis of rotation Z.

The axis Z is for example substantially perpendicular to the outer surface of the fuselage 12 and therefore to the incident airflow during the flight of the aircraft. This airflow is denoted using reference F in FIG. 1.

The movable part 16 comprises a rotary element 21, an excitation motor 22, stabilization means 23 and a sensor 24.

The rotary element 21 is able to rotate the movable part 16 about the axis of rotation Z under the influence of the airflow F.

This rotary element 21 also defines an equilibrium position in which its rotation about the axis of rotation Z is stabilized by the airflow F.

In the example of FIG. 1, the rotary element 21 is directly exposed to the airflow F and therefore assumes the form of a paddle. Thus, in the example of this figure, the probe 10 is a probe of the vane type.

According to another example embodiment (not illustrated), the probe 10 is a probe with differential pressure equalization between two zones. In this case, the probe further comprises a symmetrical cone exposed to the airflow F and provided with a slot for each of the zones. This cone comprises an inner partition that is rotatable as a function of the difference in pressures in the zones. In this way, this rotary partition has a rotary element 21 within the meaning of the present invention.

The excitation motor 22 allows a rotation of the rotary element 21 to be induced from a control signal.

In the preferred embodiment of the invention, this excitation motor 22 has an electric motor coupled to a flywheel. It is therefore an inertial motor.

According to another example embodiment, this motor 22 is a torque motor then comprising a rotor in the movable part 16 and a stator in the stationary part 15.

Using an inertial motor, however, makes it possible to avoid a fault mode such as a blockage or braking specific to a torque motor.

The stabilization means 23 allows stabilization of the rotary element 21 about its equilibrium position.

These stabilization means may be mechanical or electrical in nature.

In the preferred embodiment of the invention, the stabilization means 23 are electrical in nature and are formed by the excitation motor 22. Thus, according to this example embodiment, the inertial motor 22 makes it possible not only to induce a rotation of the movable element 21, but also to stabilize it about its equilibrium position.

In a variant, the stabilization means 23 are also electrical in nature, but form separate means from the excitation motor 22.

The sensor 24 allows generation of a measurement signal comprising the angle of rotation of the movable part 16 about the axis of rotation Z.

This sensor 24 may be mechanical in nature, such as an inertial gyrometer for example, or electrical or optical.

According to the invention, the probe 10 further comprises a processing module 30 connected both to the motor 22 and to the sensor 24.

This module 30 allows generation of a control signal intended for the motor 22 and reception of a measurement signal generated by the sensor 24.

More generally, this processing module 30 allows implementation of a self-testing method 100 of the probe 10, explained in more detail hereinafter.

To do this, the processing module 30 at least partially assumes the form of software and/or a programmable logic circuit of the FPGA type (Field-Programmable Gate Array).

In the first case, the software is implemented by using a processor and a memory, for example an existing on-board computer. This software is therefore connected to the motor 22 and the sensor 23 by transmission means known in themselves.

In the second case, the software circuit may be arranged near the stationary part 15 of the probe or remote therefrom.

Figure 2:
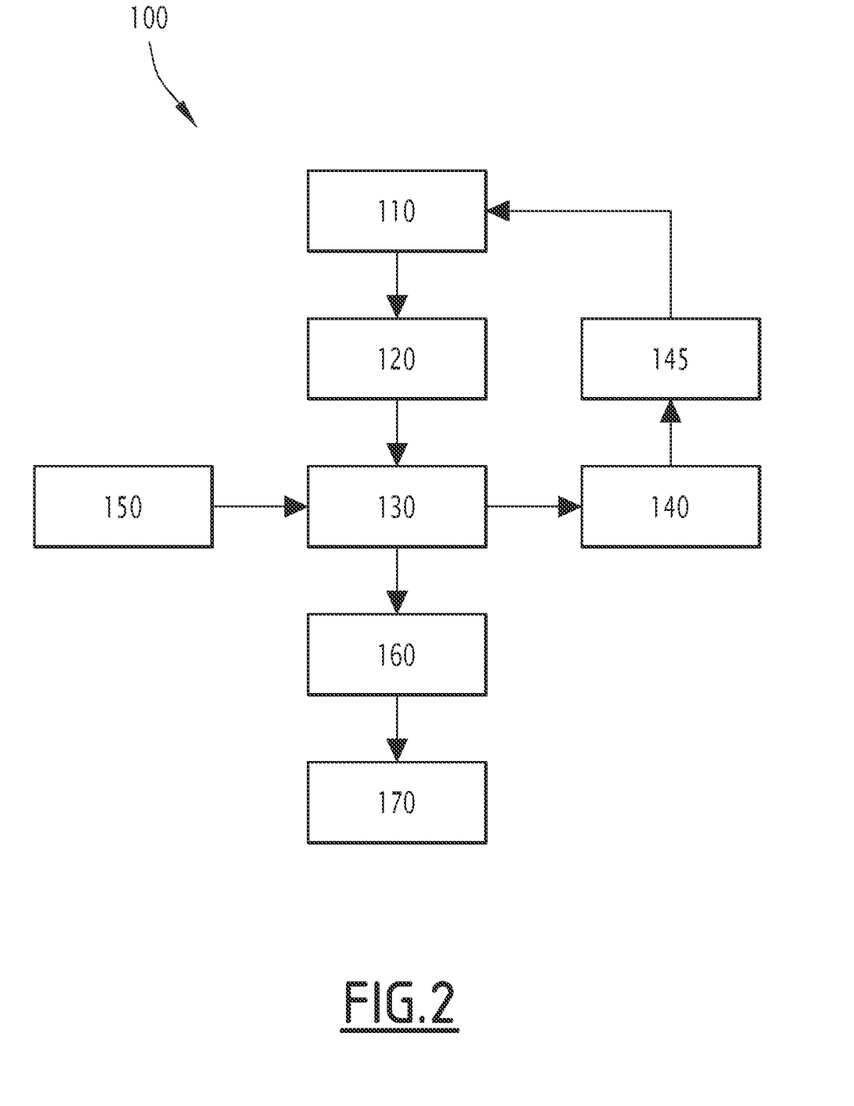
FIG. 2 is a flowchart of a self-testing method according to the invention, the self-testing method being carried out by the angle-of-attack probe of FIG. 1.

The self-testing method 100 of the probe 10 will now be explained in reference to FIG. 2, showing a flowchart of its steps.

This method 100 is for example carried out periodically or continuously during the flight of the aircraft. According to another example embodiment, this method is carried out upon express request by a pilot and an avionics system.

During step 110 of the method 100, the processing module 30 generates an angular excitation command of the rotary element 21 about its equilibrium position according to known excitation characteristics, at different instants $t_1, \ldots, t_n$.

The excitation characteristics for example assume the values of the current sent to the motor 22 at the corresponding instants. Thus, these characteristics for example take the form of an excitation vector Te having the following form:

$$Te = \begin{pmatrix} Te(t_1) \\ \ldots \\ Te(t_n) \end{pmatrix}.$$

Advantageously, the excitation characteristics Te define a sinusoidal excitation of the rotary element, preferably pseudo-random.

During step 120, the processing module 30 acquires angular measurements relative to the rotation of the rotary element 31 at the instants $t_1, \ldots, t_n$ and measured by the sensor 24.

Then, the processing module 30 determines first and second time derivatives of these measurements to obtain a measurement matrix M as follows:

$$M = \begin{pmatrix} \theta''(t_1) & \theta'(t_1) & \theta(t_1) & 1 \\ \ldots & \ldots & \ldots & \ldots \\ \theta''(t_n) & \theta'(t_n) & \theta(t_n) & 1 \end{pmatrix}.$$

Then, during step 130, the processing module 30 determines a parasitic torque Tq applied to the rotary element 31 from values obtained in steps 110 and 120.

This parasitic torque for example comprises four components assuming the following form:

$$Tq = \begin{pmatrix} Tq3 \\ Tq2 \\ Tq1 \\ Tq0 \end{pmatrix},$$

where:
Tq3 is an order 3 component called inertial component and for example corresponding to a moment of inertia anomaly;
Tq2 is an order 2 component called damping component;
Tq1 is an order 1 component called proportional component and for example corresponding to a lift anomaly; and
Tq0 is an order 0 component called mechanical friction and imbalance component.

The physical meaning of these components originates from the rotation model of the rotary element 21, assuming the following form:

$$\left(J + \frac{Tq3}{\frac{d^2\theta}{dt^2}}\right)\frac{d^2\theta}{dt^2} + \left(b + \frac{Tq2}{\frac{d\theta}{dt}}\right)\frac{d\theta}{dt} + \left(K + \frac{Tq1}{\theta}\right)\theta + \text{noise}(t) + Tq0 + Te(t) = 0,$$

where:
J, b are coefficients evolving relatively little during the lifetime of the probe;
K is a coefficient proportional to the velocity of the airflow F squared; and
noise(t) is an aerodynamic noise.

This last relationship may also be written in a matrix form in view of the preceding notions and as follows:

$$C = (M^T M)^{-1} M^T Te,$$

where $$C = \begin{pmatrix} J + Tq3 \\ b + Tq2 \\ K + Tq1 \\ \text{noise}(t) + Tq0 \end{pmatrix}.$$

To determine the components Tq3 and Tq2, it is assumed that the coefficients J and b are known or may be determined by calibration and do not change significantly during the operation of the probe 10.

Thus, these components Tq3 and Tq2 may be determined directly by using the values obtained during the preceding steps.

The component Tq0 is determined by minimizing the aerodynamic noise.

To do this, during step 140, the processing module 30 acquires data relative to the aerodynamic noise and for example originating from external sensors, such as an inertial unit of the aircraft.

Then, during step 145, the processing module 30 modifies the excitation characteristics Te allowing reduction of this noise and therefore carries out steps 110 and 120 again.

To determine the component Tq1, the processing module 30 implements a first mechanization or a second mechanization.

According to the first mechanization, the component Tq1 is determined by using at least one consensus velocity value.

In such a case, the processing module 30 implements step 150, during which it acquires at least one value of the airflow F velocity modulus, called consensus velocity, originating from measuring means that are materially separate from the probe 10.

Preferably, said measuring means is another angle-of-attack probe or a series of Pitot probes preferably including several Pitot probes, the measurements of which are consistent amongst themselves and several static probes. Thus, in this case, the consensus velocity is determined as the pressure velocity determined by the series of Pitot probes.

The consensus velocity is preferably described by its mean, its variance, the number and the expected precision of sources if there are multiple sources.

Then, with the consensus velocity, the processing module 30 determines the coefficient K and, from this coefficient, the component Tq1.

According to the second mechanization, the processing module 30 sets the value Tq1 and determines a value of the modulus of the airflow F velocity, called extrapolated velocity, from this value Tq1.

Advantageously, the first and the second mechanizations are reiterated several times.

In this case, at the end of step 150, the processing module 30 compares the consensus velocity according to the first mechanization with the extrapolated velocity according to the second mechanization, and the value of the component Tq1 obtained according to the first mechanization with the value of the component Tq1 used for the second mechanization.

If these comparisons fall within a predetermined likelihood domain, the processing module 30 establishes a proper operating criterion and therefore uses the values Tq1 and the consensus velocity. Otherwise, the processing module 30 reiterates the first and the second mechanizations.

During step 160, the processing module 30 compares at least one component of the parasitic torque Tq with at least one predetermined threshold.

Preferably, during this step, the processing module 30 compares each of the components of the parasitic torque Tq with at least one predetermined threshold.

Then, during step 170, the processing module 30 diagnoses a fault of the probe when, during step 160, at least one of the components of the parasitic torque Tq exceeds the corresponding threshold.

When a fault is diagnosed, the processing module 30 for example emits an alarm intended for the pilot or for any other avionics system.

Advantageously, according to the invention, the fault nature may be determined by identifying the component of the parasitic torque Tq having exceeded the corresponding threshold.

In particular, when it involves the component Tq0, the failure may be due to friction or to an imbalance of the masses of the corresponding probe.

When it involves the component Tq1, the failure may correspond to an aerodynamic lift anomaly of the paddle: either the paddle is broken or deformed, or it is covered in ice.

The cases of ice and of breakage are also detectable by the inertial component TO.

For a given probe, the case of deformation may be diagnosed easily by using data originating from other probes, since in general, two probes cannot deform in the same way.

Lastly, exceeding of the corresponding threshold by the component Tq2 would mean abnormal damping of the paddle.

One can then see that the self-testing method according to the invention allows a self-testing function of the probe 10 to be carried out during the flight of the aircraft, without using data originating from other angle-of-attack probes.

This allows a diagnosis without using a majority vote, which offers the desired level of safety while retaining an architecture with two probes. Owing to the location of the fault that it allows, which greatly strengthens the location by majority vote, the device also strengthens the integrity and availability on architectures with more than two probes.

The device allows checking of the information originating from other probes used in the aircraft, and in particular Pitot probes allowing measurement of the pressure velocity of the airflow F.

In fact, generally, an aircraft comprises a measuring series made up of a plurality of angle-of-attack probes and a measuring series made up of Pitot probes.

Figure 3:
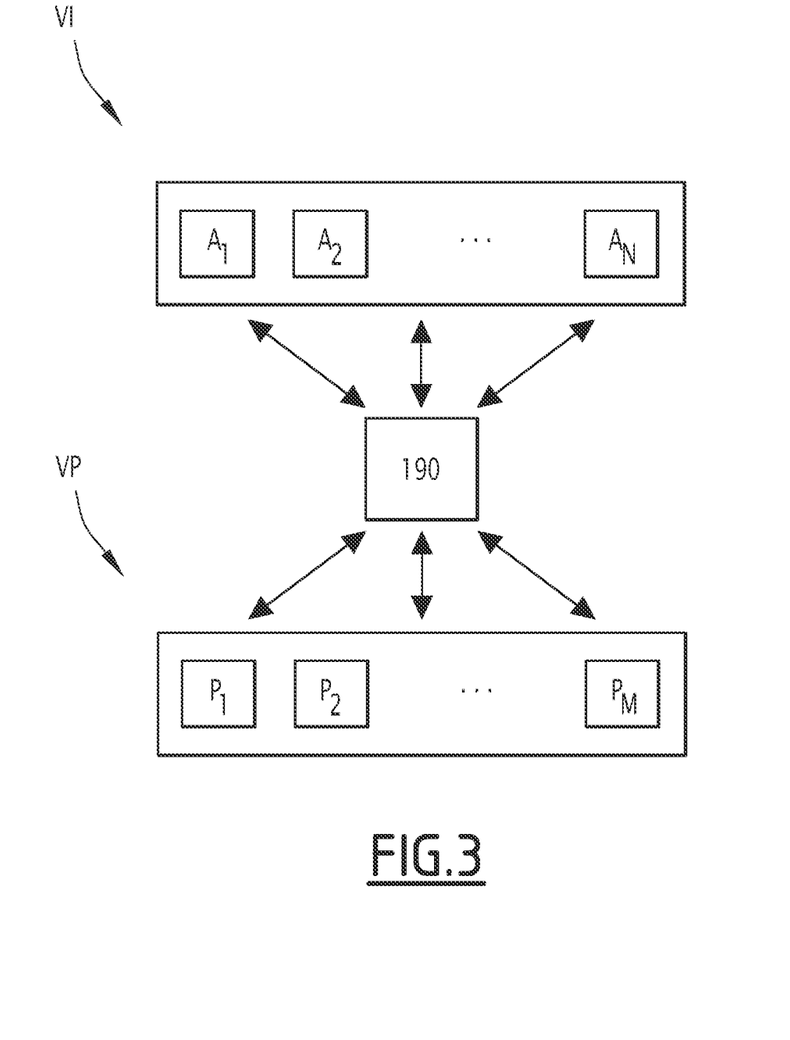
FIG. 3 is a schematic view of a series of Pitot probes and a series of angle-of-attack probes, the series of angle-of-attack probes comprising a plurality of angle-of-attack probes similar to that of FIG. 1.

FIG. 3 shows a series of angle-of-attack probes VI including a plurality of angle-of-attack probes $A_1, \ldots, A_N$ and a series of Pitot probes VP including a plurality of Pitot probes $P_1, \ldots, P_M$, each of the Pitot probes being able to measure a pressure called total pressure. The series of Pitot probes VP further comprises a plurality of static probes (not illustrated) able to measure a pressure called static pressure.

The series of Pitot probes thus allows measurement of the pressure velocity of the airflow F by using total pressure and static pressure values.

Each of the angle-of-attack probes $A_1, \ldots, A_N$ is similar to the angle-of-attack probe 10 previously described insofar as it allows implementation of a self-testing method as previously described.

FIG. 3 further shows a checking module 190 at least partially assuming the form of software and/or a programmable logic circuit of the FPGA type (Field-Programmable Gate Array).

Figure 4:
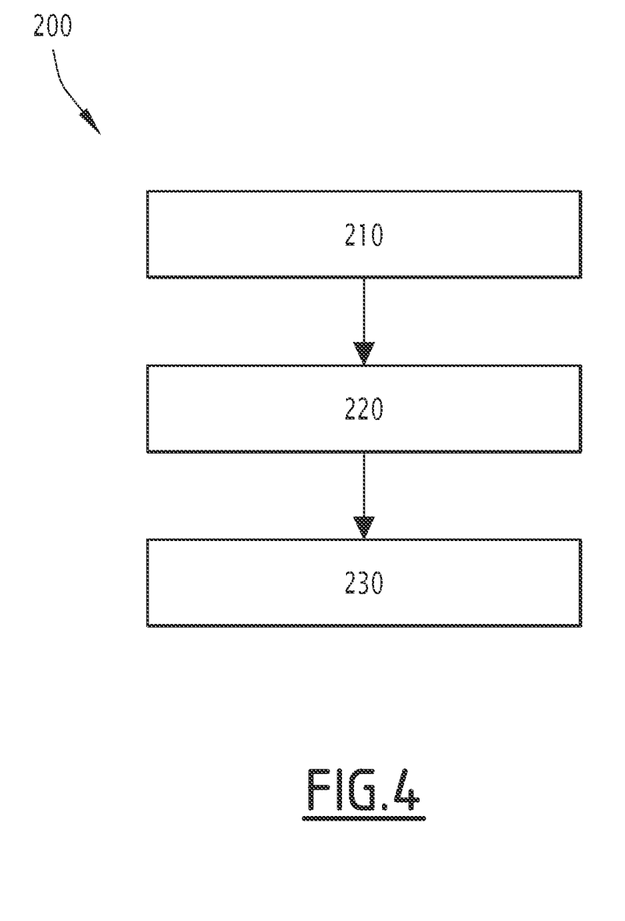
FIG. 4 is a flowchart of a checking method for checking the series of Pitot probes of FIG. 3, according to the invention.

This checking module 190 allows checking of the integrity of the data supplied by the two series VI and VP, and to do so, implements a checking method 200 that will now be explained in reference to FIG. 4, showing a flowchart of its steps.

This checking method is implemented when no operating fault of the angle-of-attack probes $A_1, \ldots, A_N$ has been detected subsequent to implementation of the self-testing method by the processing module 30 of each of these probes.

Furthermore, it is initially considered that the assembly of the anemometric installation, that is to say, the Pitot probes $P_1, \ldots, P_M$ associated with the static probes and the pressure measuring means, associated or not with a lidar, indicates a velocity value of the "pressure velocity" type of the airflow F, which will be referred to hereinafter as first velocity value.

In the present document, the term "velocity of the airflow" or "velocity of the air" refers to the "pressure velocity," calculated from only the values supplied by the Pitot probes and the static probes.

As is known per se, the pressure velocity may also be called conventional velocity or "Conventional Air Speed" or "CAS." In particular, this pressure velocity must not be confused with the true velocity or "True Air Speed" or "TAS," which refers to the mean velocity of the air molecules.

During the initial step 210, the checking module 190 acquires all of the first velocity values indicated via the Pitot probes $P_1, \ldots, P_M$ and/or via the lidar(s).

During the same step, this checking module 190 further acquires velocity values of the airflow F determined by the processing modules 30 of the set of angle-of-attack probes $A_1, \ldots, A_N$, during step 130.

Each of these velocity values will be called second velocity value hereinafter.

During the following step 220, the checking module 190 compares the second velocity values with the first velocity values and, after this comparison, uses velocity values to indicate the velocity of the airflow F.

In this comparison, several cases are possible.

In particular, when all of the first and second velocity values are consistent with one another, the checking module 190 keeps the set of first velocity values and second velocity values at nominal precision.

When one of the first velocity values is inconsistent with respect to the other first velocity values and the second velocity values, which are consistent amongst themselves and with respect to the other first velocity values, the checking module 190 keeps said other first velocity values and all of the second velocity values at nominal precision.

When the first velocity values are inconsistent amongst themselves and none of these values is consistent with the second velocity values, which are consistent amongst themselves, the checking module 190 keeps the first velocity values are used at degraded precision and the second velocity values at nominal precision.

When—all of the first values are consistent amongst themselves but inconsistent with respect to the second velocity values, which are consistent with one another, the checking module 190 keeps the set of first velocity values and of second velocity values at nominal precision with an indication of doubt regarding the supplied values.

In all other cases, no velocity value is used by the checking module 190.

During the following step 230, the checking module 190 communicates the kept velocity values, optionally with their precision, to the pilot or to any other avionics system.

One can thus see that the checking method 200 according to the invention allows checking of all of the Pitot probes. This presents a particular advantage of the invention, since among all of the components of an anemometric system generally equipping an aircraft, the Pitot probes are the components whose integrity is most difficult to establish in flight, given their environment.

The invention claimed is:

1. A method for self-testing an angle-of-attack probe, the angle-of-attack probe being able to measure the angle of attack of an airflow in a measurement region and comprising a rotary element that is rotatable about an axis of rotation under the influence of the airflow, the axis of rotation being substantially perpendicular to the direction of said airflow, the rotary element defining an equilibrium position in which its rotation about the axis of rotation is stabilized by the airflow;
the method comprising the following steps:
controlling an angular excitation of the rotary element about its equilibrium position according to known excitation characteristics;
acquiring angular measurements relative to the rotation of the rotary element;
determining a parasitic torque applied to the rotary element from angular measurements and excitation characteristics;
comparing at least one component of the parasitic torque with at least one predetermined threshold;
detecting an operating fault in the probe when said component exceeds the predetermined threshold.

2. The self-testing method according to claim 1, wherein the parasitic torque is determined by using a transfer function describing the rotation of the rotary element in the presence of this parasitic torque, the parasitic torque being defined by an inertial component, a damping component, a proportional component, and a friction or imbalance component of the masses.

3. The method of claim 2, wherein the proportional component is an abnormal aerodynamic torque.

4. The method of claim 2, wherein the inertial component is a moment of inertia anomaly.

5. The self-testing method according to claim 2, wherein the inertial component, the damping component and the friction and imbalance component are determined by identifying the portion of the parasitic torque for each corresponding component by subtracting a predetermined portion of a maximum normal torque in its likelihood domain.

6. The self-testing method according to claim 1, further comprising a step for acquiring at least one value of the airflow velocity modulus, the at least one value of the airflow velocity modulus being a consensus velocity, originating from measuring means that are materially separate from said probe;
said measuring means being another angle-of-attack probe or a velocity measurement series comprising one or several Pitot probes or one or several lidars.

7. The self-testing method according to claim 6, wherein the proportional component and a pressure velocity of the airflow are determined during the step of determining the parasitic torque, with respect to one another by using a first mechanization and a second mechanization; wherein:
according to the first mechanization, the consensus velocity is inserted into the transfer function, the proportional component being determined by using the other components of the parasitic torque;
according to the second mechanization, the proportional component is determined from a predetermined value, a pressure velocity value, called extrapolated velocity, being determined by using the set of components of the parasitic torque;
the consensus velocity according to the first mechanization being compared to the extrapolated velocity according to the second mechanization,
the proportional component according to the first mechanization being compared to the proportional component according to the second mechanization, and
a proper operation criterion being established and the proportional component and the consensus velocity are used when said comparisons fall within a predetermined likelihood domain, otherwise the first and second mechanizations are reiterated.

8. The self-testing method according to claim 1, wherein the excitation characteristics define a sinusoidal excitation of the rotary element, the frequency of which is pseudo-random.

9. The self-testing method according to claim 1, further comprising the following steps:
acquiring data relative to the aerodynamic noise;
modifying the excitation characteristics as a function of the acquired data relative to the aerodynamic noise.

10. An angle-of-attack probe able to measure the angle of attack of an airflow in a measurement region and comprising a rotary element that is rotatable about an axis of rotation under the influence of the airflow, the axis of rotation being substantially perpendicular to the direction of said airflow, the rotary element defining an equilibrium position in which its rotation about the axis of rotation is stabilized by the airflow;
the angle-of-attack probe being characterized in that it further comprises a processing module configured to:
control an angular excitation of the rotary element about its equilibrium position according to known excitation characteristics;
acquire angular measurements relative to the rotation of the rotary element;
determine a parasitic torque applied to the rotary element from angular measurements and excitation characteristics;
compare at least one component of the parasitic torque with at least one predetermined threshold;
detect an operating fault in the probe when said component exceeds the predetermined threshold.

11. The probe according to claim 10, further comprising an excitation motor able to cause an excitation of the rotary element about its equilibrium position according to the excitation characteristics, the excitation motor being an electric motor coupled to a flywheel.

12. The probe according to claim 10, further comprising stabilization means for stabilizing the rotary element about its equilibrium position, said stabilization means comprising an excitation motor.

13. The probe according claim 10, further comprising a sensor capable of generating angular measurements relative to the rotation of the rotary element.

14. The probe according to claim 10, wherein the rotary element is a vane exposed directly to the airflow.

15. The probe according to claim 10, wherein the rotary element is comprised in a cone exposed to the airflow and symmetrical relative to the axis of rotation.

* * * * *